United States Patent [19]
Nishikawa et al.

[11] Patent Number: 5,101,228
[45] Date of Patent: Mar. 31, 1992

[54] STORAGE VESSEL DETECTING MECHANISM

[75] Inventors: Tomoyuki Nishikawa, Matsudo; Masahiro Kita, Tokyo; Takaaki Yano, Kawagoe; Tatsuya Yoshida, Saitama; Ryoji Honda, Asaka; Kiyoshi Negishi, Tsurugashima; Ikuo Negoro, Sakado; Tsutomu Sato, Tokyo; Shoji Kamasako, Tsurugashima, all of Japan

[73] Assignee: Asahi Kogaku Kogyo Kabushiki Kaisha, Tokyo, Japan

[21] Appl. No.: 611,537

[22] Filed: Nov. 13, 1990

[30] Foreign Application Priority Data

Nov. 10, 1989 [JP] Japan .................................. 1-293712
Apr. 9, 1990 [JP] Japan .................................. 2-93659

[51] Int. Cl.⁵ .......................................... G03G 21/00
[52] U.S. Cl. .................................. 355/206; 355/298; 340/613
[58] Field of Search ............... 355/203, 205, 206, 298, 355/260; 340/613, 617

[56] References Cited

U.S. PATENT DOCUMENTS

| | | | |
|---|---|---|---|
| 3,838,922 | 10/1974 | Nelson | 355/298 |
| 3,909,258 | 9/1975 | Kotz | 430/122 |
| 4,436,414 | 3/1984 | Kamiyama et al. | 355/298 |
| 4,640,880 | 2/1987 | Kawanishi et al. | 430/106.6 |
| 4,952,974 | 8/1990 | Mori | 355/200 |

FOREIGN PATENT DOCUMENTS

1-983  1/1989  Japan .................................. 355/298

*Primary Examiner*—Joan H. Pendegrass
*Attorney, Agent, or Firm*—Sandler, Greenblum, & Bernstein

[57] ABSTRACT

A storage vessel detecting mechanism is used for detecting an error condition of a storage vessel, which is detachably fitted in a main apparatus. The vessel is movably fitted in the main apparatus, and one end of a movable member, which is pivoted, is engaged with the vessel. The other end of the movable member is located between first and second positions when the vessel is not installed and when the vessel is accommodating a predetermined amount of substances therein. It is determined whether the other end of the movable member is located in a predetermined range. An error condition of the vessel is detected when the other end of the movable member is located at a position other than in the predetermined range.

11 Claims, 13 Drawing Sheets

FIG. II

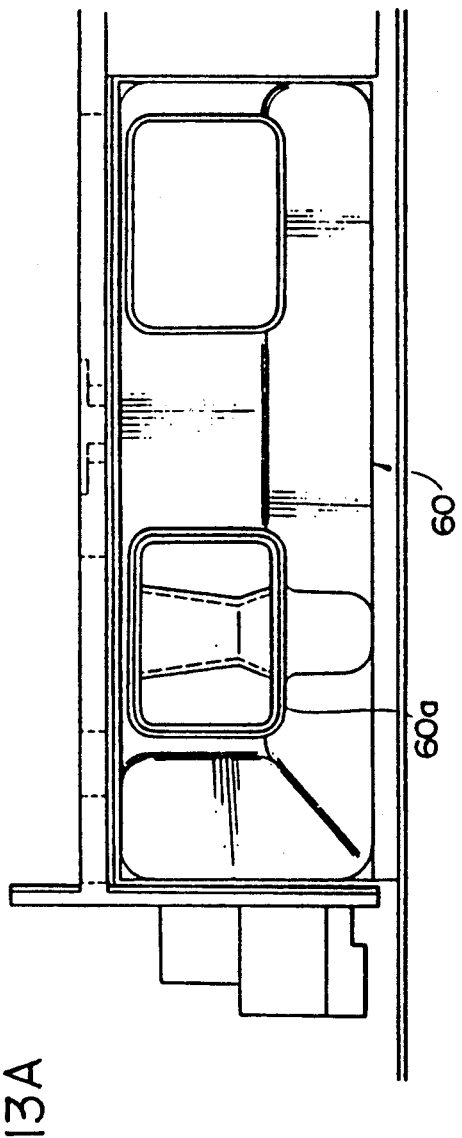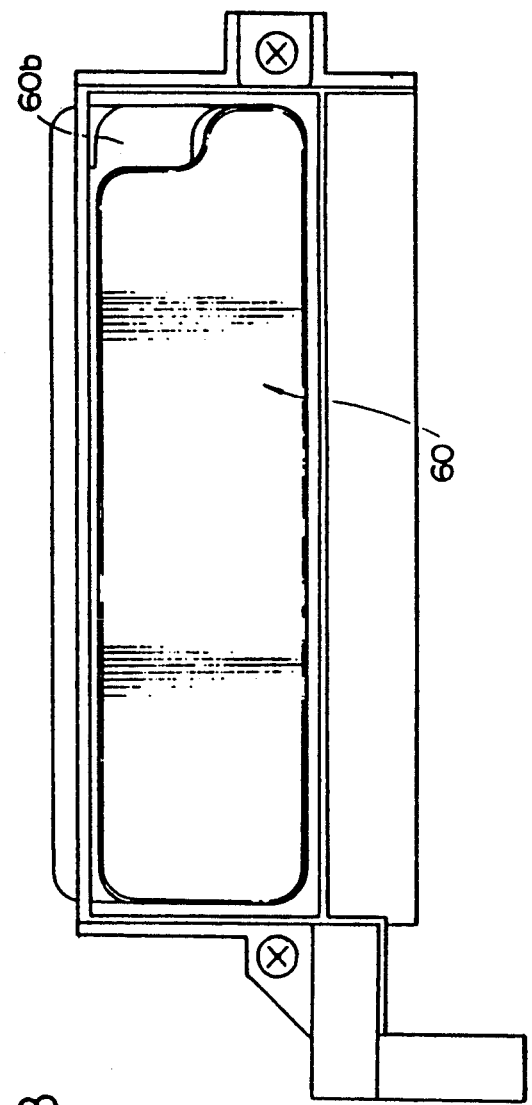
FIG. 13A
FIG. 13B

STORAGE VESSEL DETECTING MECHANISM

BACKGROUND OF THE INVENTION

The present invention relates to a detecting mechanism for detecting a vessel in which a pulverulent body, a fluid or the like is stored.

As vessels of the sort mentioned above, there are known vessels such as waste toner boxes provided in laser printers, copying machines and the like.

The waste toner box is designed to store the residual toner from a photoconductive drum after the step of transferring an image to a recording sheet is completed in an electrophotographic image transferring process.

If the waste toner is stored in the waste toner box to above a certain amount, it will overflow into the printer unless the stored waste toner is discharged or removed. If no waste toner box is installed, the printer will be stained internally if printing is started without the toner box.

In conventional printers, sensors for respectively detecting the presence or absence of a waste toner box, and the full condition of waste toner are provided. The problem is, not only the number of sensors needed, but also the complexity of their control system tends to increase by the use of plural sensors.

SUMMARY OF THE INVENTION

It is therefore an object of the present invention to provide an improved detection device capable of detecting the presence or absence of a storage vessel, as well as the condition that the weight of the material stored therein has exceeded a predetermined value, with one sensor.

In such a storage vessel as the aforementioned waste toner box, it is necessary for an error alarm to be issued when the vessel is not installed and when the weight of the material stored therein has exceeded a predetermined value. However, it is not always necessary to distinguish between the error alarms, because the waste toner box has to be checked in either case when an error has occurred.

To accomplish the above object, according to the present invention, there is provided a storage vessel detecting mechanism installed in a main apparatus, which comprises, a storage vessel detachably fitted in the main body, a guide mechanism for vertically guiding the storage vessel, a movable member pivoted to the main apparatus body. One end of the movable member is positioned for being engaged with the storage vessel, the other end of the movable member being formed to be relatively heavy so that when the one end of the movable member is disengaged from the vessel, the one end is lifted by the weight of the other end of the movable member to be located at a first position, the other end of the movable member being pressed down to be located at a second position when the storage vessel accommodating a predetermined amount of a substance therein is installed and engaged with the movable member.

A discrimination mechanism for discriminating whether the other end of the movable member is located in a predetermined range between the first and second positions, and a determination mechanism for determining the error condition of the vessel when the other end is located in a position other than within the predetermined range are provided.

According to another aspect of the invention, there is provide electrophotographic printer in which toner is used for forming an image.

A storage vessel is detachably fitted in the printer for storing waste toner and a guide is provided in the printer for vertically guiding the storage vessel, a movable member pivoted to said printer, one end of said movable member being to be engaged with said storage vessel, the other end of said movable member being formed to be relatively heavy so that when said one end of said movable member is disengaged with said vessel, said one end is floated by the dead weight of said other end of said movable member to be located at a first position, said other end of said movable member being pressed down to be located at a second position when said storage vessel accommodating predetermined amount of toner therein is installed and engaged with said movable member;

discrimination means for discriminating whether said other end of said movable member is located in a predetermined range between said first and second positions; and determination means for determining the full condition of said vessel when said other end is located the position other than said predetermined range.

DESCRIPTION OF THE ACCOMPANYING DRAWINGS

FIGS. 13A and 13B are a top view and a bottom view of a waste toner box;

DESCRIPTION OF THE EMBODIMENTS

Figure 1:
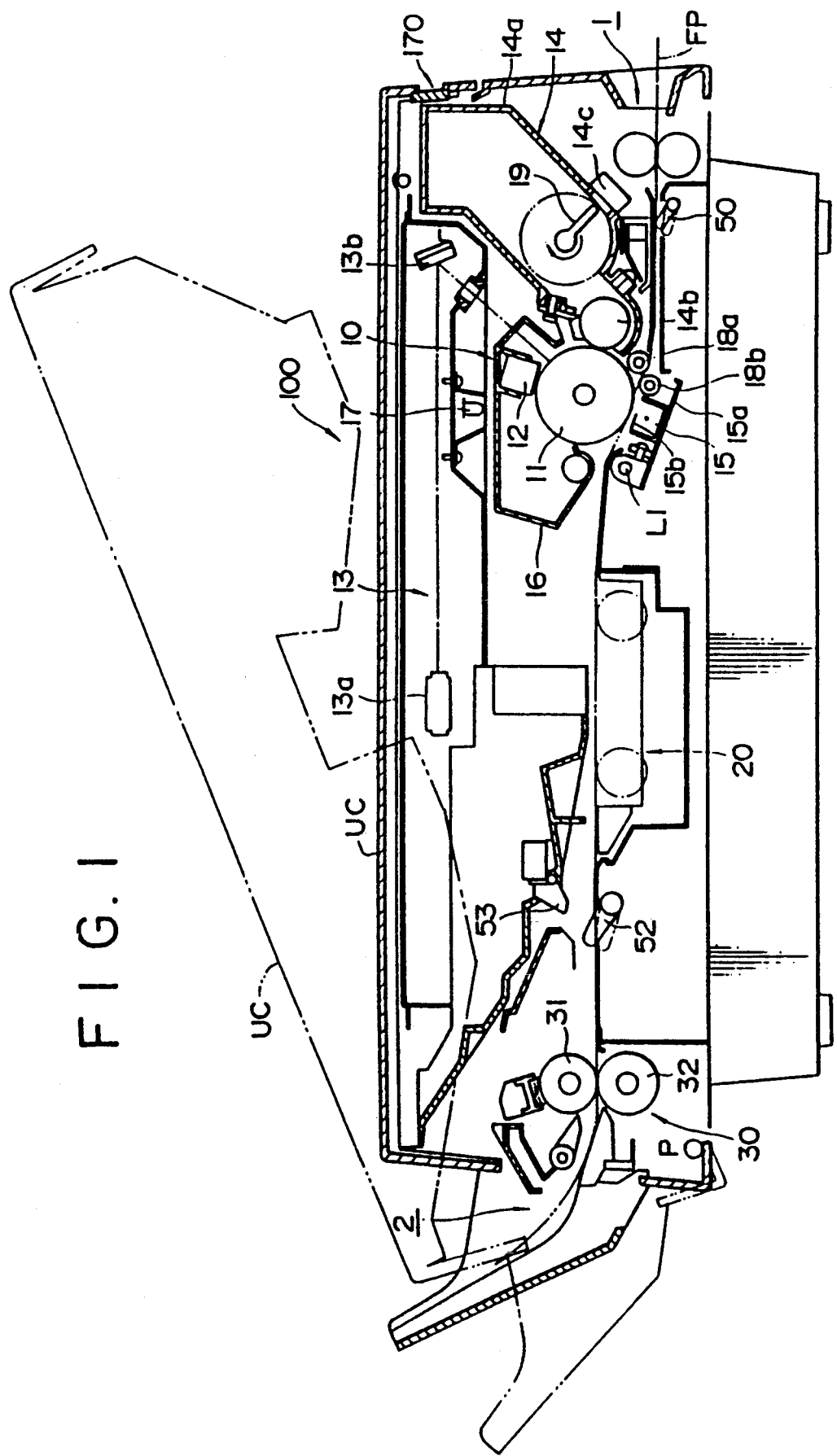
FIG. 1 is a schematic sectional view of a printer embodying the present invention.

A printer 100 shown in FIG. 1 is a laser beam printer employing an electrophotographic image transfer system. The printer 100 comprises, in sequence, a transfer unit 10 including a photoconductive drum 11, a tractor unit 20 having an endless belt 21 for feeding a recording sheet, and a fixing unit 30 having a pair of rollers 31, 32 for heating and pressing an unfixed toner image in order to fix it on the recording sheet. Light carrying printing data from a host computer or the like is emitted from a laser scanning unit (LSU) 13, the charged circumferential surface of a photoconductive drum 11 is exposed to the light, a latent image is formed on the circumferential surface of the photoconductive drum 11. Toner is stuck to the circumferential surface of the photoconductive drum 11 to develop a toner image by a developing unit 14. Then the toner image is transferred onto the recording sheet at a transfer charger 15, and the image thus transferred is fixed by a fixing unit 30. The printer 100 employs the electrophotographic image transfer system, and so it is designed to be a page printer which starts printing after the printing data for one page is accumulated. The laser scanning unit 13 is secured to an upper cover UC. The upper cover UC is rotatably disposed on the main body of the printer 100 so that it can be rocked around a pivot axis P.

This printer 100 uses a continuous form recording sheet FP, which is known as fan-fold sheet. The fan-fold is a foldable continuous sheet having feed holes at both side ends, and perforated tear lines along which the recording sheet FP is cut off easily. Projections are provided on the endless belt 21 which are to be fitted to the feed holes of the continuous form recording sheet FP. The continuous form recording sheet FP is fed from a feed port 1 to a discharge port 2. It should be noted that the printer 100 is designed to print pages between perforations in order to prevent printed data from tearing apart when the recording sheet FP is torn off at the perforated tear lines.

In case of a printer using a cut-sheet, the distance between transferring position and fixing position is not so important because printing data for one page is printed onto one sheet of recording paper. On the other hand, in a printer using a continuous sheet, if the whole portion of the sheet carrying unfixed toner image is caused to pass through the fixing position and fixed, the paper may be wasted to the extent of the distance between transfer and fixing positions. Consequently, it is necessary to determine the portion of the sheet carrying a toner image to be fixed. In other words, it is necessary to determine the portion carrying an unfixed toner image to be remained in the printer between the transfer and fixing positions.

When the printing quality is taken into consideration, the interruption and resumption of transfer and fixing should preferably be made at the perforations where data is not printed. For this reason, the distance between the transfer position and fixing position is preferably arranged equal to the length of one page so that the perforations are located at the transfer and fixing positions when printing is stopped.

As arranged above, the portion carrying an unfixed toner image of one page length remains between the transferring and fixing positions in a standby state when the printing is terminated. When another page is printed, the unfixed toner image is fixed and the remaining page is discharged. In this way, waste of paper due to the fixing of every transferred image becomes avoidable.

The distance between the transferring and fixing positions of this printer 100 is set to eleven inches long for the continuous recording sheet which page length is eleven inches long.

The transfer unit 10 comprises a charger 12 for charging a photoreceptor material on the circumferential surface of the photoconductive drum 11 with electricity, the laser scanning unit 13 for exposing light to the photoconductive drum 11, a developing unit 14 for adhering toner to the latent image formed on the photoconductive drum 11, a transfer charger 15 for charging the recording sheet FP with electricity to cause to toner image to be transferred to the recording sheet FP, a cleaning unit 16 for removing the residual toner on the drum, and a discharging LED 17 for totally exposing the photoconductive drum 11 to light so as to remove the charge thereon.

The photoconductive drum 11 should be exchanged after being used for printing a certain number of pages, since its properties will deteriorate and the drum will fail to ensure clear printing. For example, a limit of use is set at approximately 20,000 pages. The number of printed pages are electrically counted and recorded in a counter by a control system which is described later. This counter is reset when an upper cover UC is shut after a new photoconductive drum 11 is installed.

An outwardly protruded projection (not shown) is provided on a new photoconductive drum 11. As the projection presses down a reset switch, not shown, on the body side, the control system can detect that the new photoconductive drum 11 is placed in position. The projection retracts when the operation is started and an indication of the new drum disappears. The control system resets the counter when the upper cover UC is shut after the reset switch is turned on.

The laser scanning unit 13, which is secured in the upper cover UC, continuously deflects ON/OFF-modulated beams from a semiconductor laser (not shown) by means of a polygon mirror 13a. The laser beams are converged by means of a f$\theta$ lens (not shown), reflected by a beam bender 13b so that scanning lines are formed on the photoconductive drum 11, then an electrostatic latent image on a dot basis is formed as the drum rotates.

The developing unit 14 comprises a toner case 14a in which toner is accumulated, a developing roller 14b for sticking the toner onto the circumferential surface of the photoconductive drum 11 provided at the lower end of the case 14a, and a piezoelectric sensor as a toner low sensor 14c for detecting the presence or absence of the toner in the case 14a.

In normal text printing, the printing of letters are started from the left-hand side of paper so that frequency of use of toner normally tends to become high in a portion corresponding to the left-hand side of the paper. For this reason, the toner low sensor 14c is provided in the portion corresponding to the left-hand side of the paper where the toner consumption is large.

Figure 3:
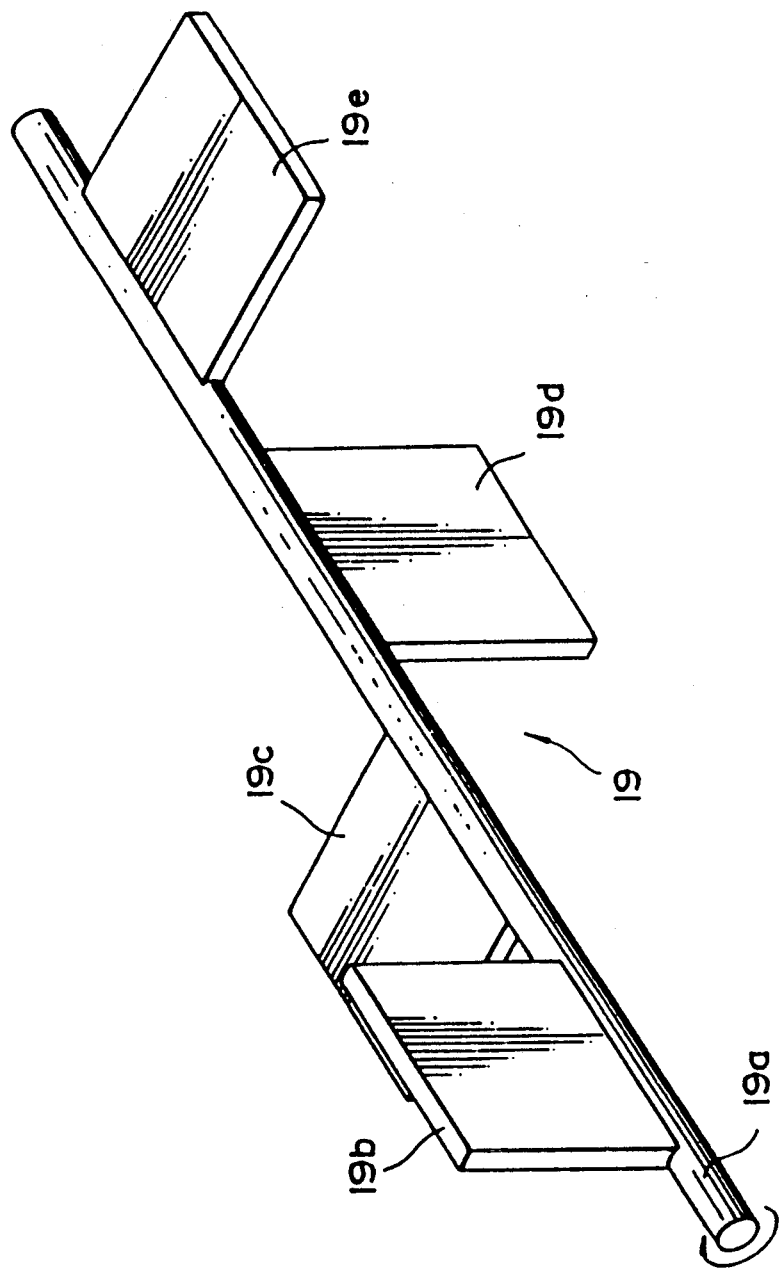
FIG. 3 is a perspective view of a scraper.

A scraper 19 is provided in the toner case 14a. The scraper 19 slowly rotates to supply the inside toner to the developing roller 14b. The scraper 19 is, as shown in FIG. 3, composed of a rotary shaft 19a to be driven by a main motor, and four pieces of blades 19b, 19c, 19d, 19e fitted such that the angle between the surfaces of the blades 19a and 19b is 90 degrees, that of the blades 19a and 19c is 180 degrees, and that of the blades 19a and 19d is 270 degrees. In this specification, this angle well be called a mounting angle, i.e., the mounting angles, with respect to the blade 19a, of the blades 19b, 19c, and 19d are 90 degrees, 180 degrees, and 270 degrees, respectively. The blades 19a through 19d are driven to rotate in the direction of an arrow shown in FIG. 3.

Since the four blades are arranged to have different mounting angles, the load applied when the toner is forced out is as one-quarter as that of the conventional scraper having all the blades set to have the same mounting angles. Consequently, the load applied to the motor decreases and fluctuates less with the scraper of this embodiment, thus suppressing noise generation.

By sequentially making the mounting angles of the blades of the scraper 19 different, as stated above, a certain amount of toner can be gradually moved to a portion corresponding to the right-hand side of the paper as the scraper 19 slowly rotates.

Heretofore, two dry development methods have been generally known. One of them is a so-called monocomponent development method, and the other is a two-component development method.

In the two-component development method, a carrier is mixed with toner, and stirred at relatively high speed by a scraper or the like in order to charge the toner.

On the other hand, in the monocomponent development method, toner is fed to a developing roller or the like without using carrier for charging the toner. This monocomponent development method is disclosed in the U.S. Pat. No. 3,909,258. However, there is a problem in this monocomponent development method. That is, the toner tends to form a block in a toner box. In order to overcome the above problem, an improved monocomponent development method, in which relatively a little amount of carrier is mixed with the toner, is disclosed in the U.S. Pat. No. 4,640,880. With mixture of a little amount of carrier with the toner, lubrication between the toner grains is improved, which prevent the toner from forming blocks. It should be noted that the mixture of the carrier does not affect chargeability of the toner. In this improved monocomponent development method, the main function of the scraper is to feed the toner to the developing roller or the like. Accordingly, the scraper rotates relatively slowly in the toner box. The improved monocomponent development method is employed in the printer 100 of the present embodiment.

When toner consumption in the portion corresponding to the right-hand side of the paper increases as it is used for an graphic output, for instance, toner low is left undetected by the toner low sensor 14c. In such a case, as the conventional scrapers do not have a function to move the toner in the manner stated above, carrier may be transferred onto the circumferential surface of the photoconductive drum 11.

According to the scraper in this embodiment, the occurrence of the carrier being transferred on the photoconductive drum 11 is made avoidable even when the toner consumption is large on the side where the toner low sensor 14c is not provided.

The transfer charger 15 is secured to an arm 15a which can be rotated by a cam mechanism around a pivot shaft L1. Moreover, a pair of guide rollers 18a, 18b are integrally secured to the arm 15a, the guide rollers 18a m 18b being laterally positioned so that the continuous form recording sheet FP is nipped therebetween.

When printing is started, it is needed to idly rotate the photoconductive drum 11 without feeding the recording sheet until the exposed portion of the photoconductive drum 11 is located at the transfer position. In this case, the arm 15a is moved down to lower the guide rollers 18a, 18b, and accordingly, the recording sheet FP is retracted from the circumferential surface of the photoconductive drum 11. The life of the photoreceptor material is thus prevented from being shortened because of wearing. In addition, the paper is also prevented from being soiled by residual toner on the photoconductive drum 11.

An opening is formed in the transfer charger 15. The opening of the transfer charger 15 is arranged so that its rearward half in the feeding direction of the recording sheet FP is covered with a Mylar film 15b, and the discharging area, which is uncovered, of the transfer charger 15 is arranged at the upstream side in the rotational direction of the photoconductive drum 11 with respect to the contact portion between the photoconductive drum 11 and the recording sheet FP.

Conventionally, the whole opening of a transfer charger has been left opened for charging. With such a setting, however, transfer efficiency tends to vary considerably as ambient humidity changes.

By narrowing the discharge area, corona discharge efficiency can be increased to prevent toner from being reversely charged under the influence of the corona discharge. Moreover, the period of time in which the recording sheet FP contacts the photoconductive drum 11 under pressure after toner image is transferred thereto can be set longer than that of conventional printers. As a result, transfer efficiency in the whole humidity range can be by far improved. Experiments show that the transfer efficiency is improved to a great extent especially when humidity is low. It is also possible to arrange the transfer charger 15 itself in upstream side in the sheet feed direction in order to prolong the period of time for applying pressure after transfer.

Figure 2:
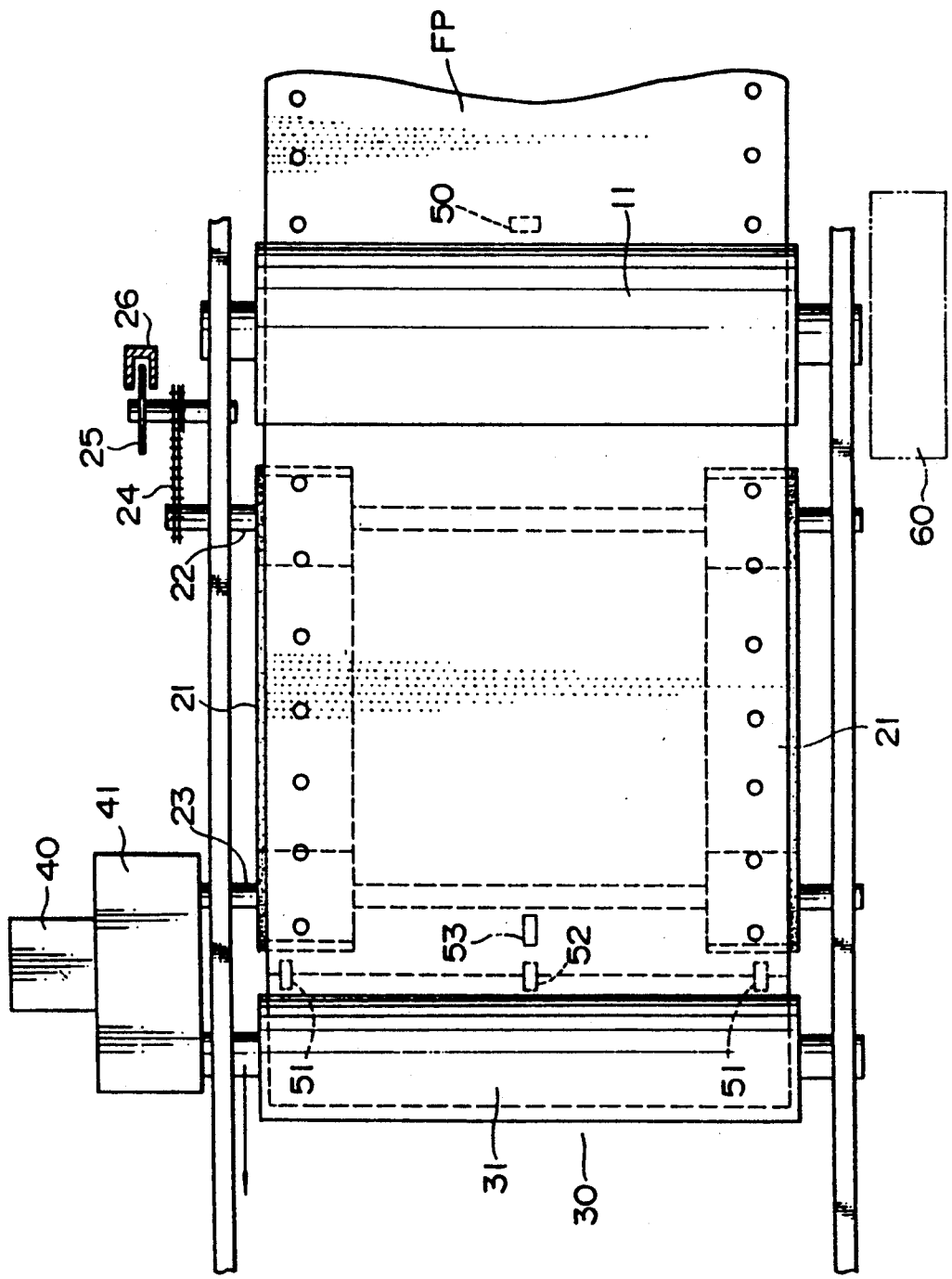
FIG. 2 is a top view of the paper conveying portion of a printer of FIG. 1.
Figure 4:
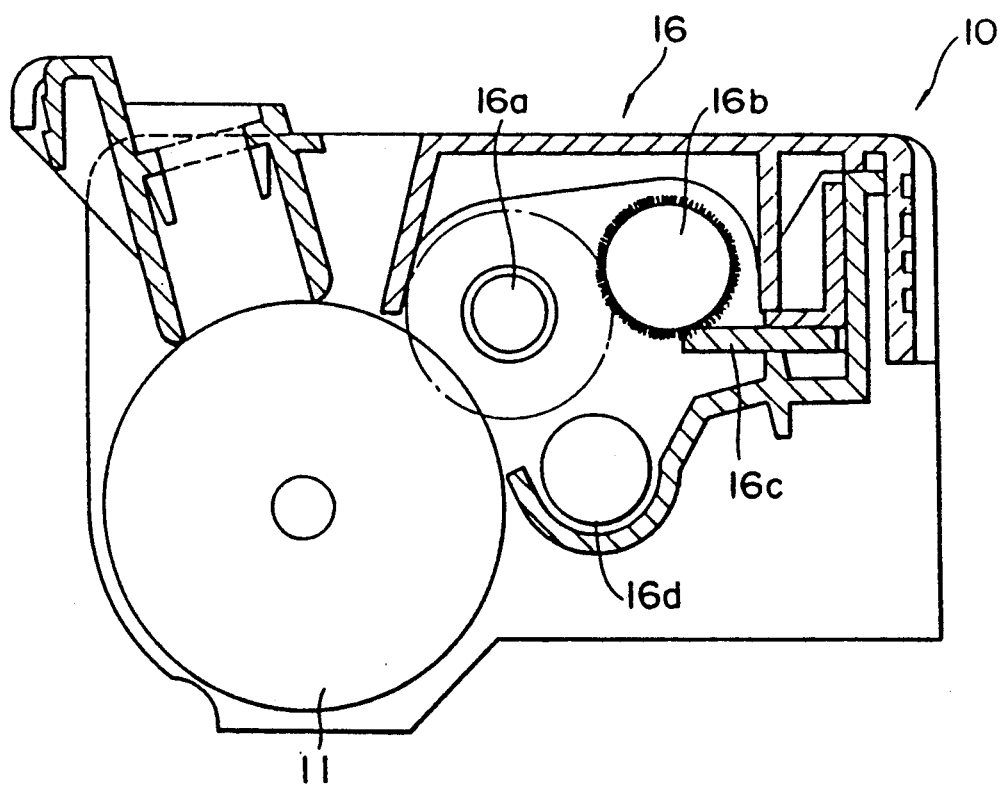
FIG. 4 is a sectional view of a cleaning unit.
Figure 5:
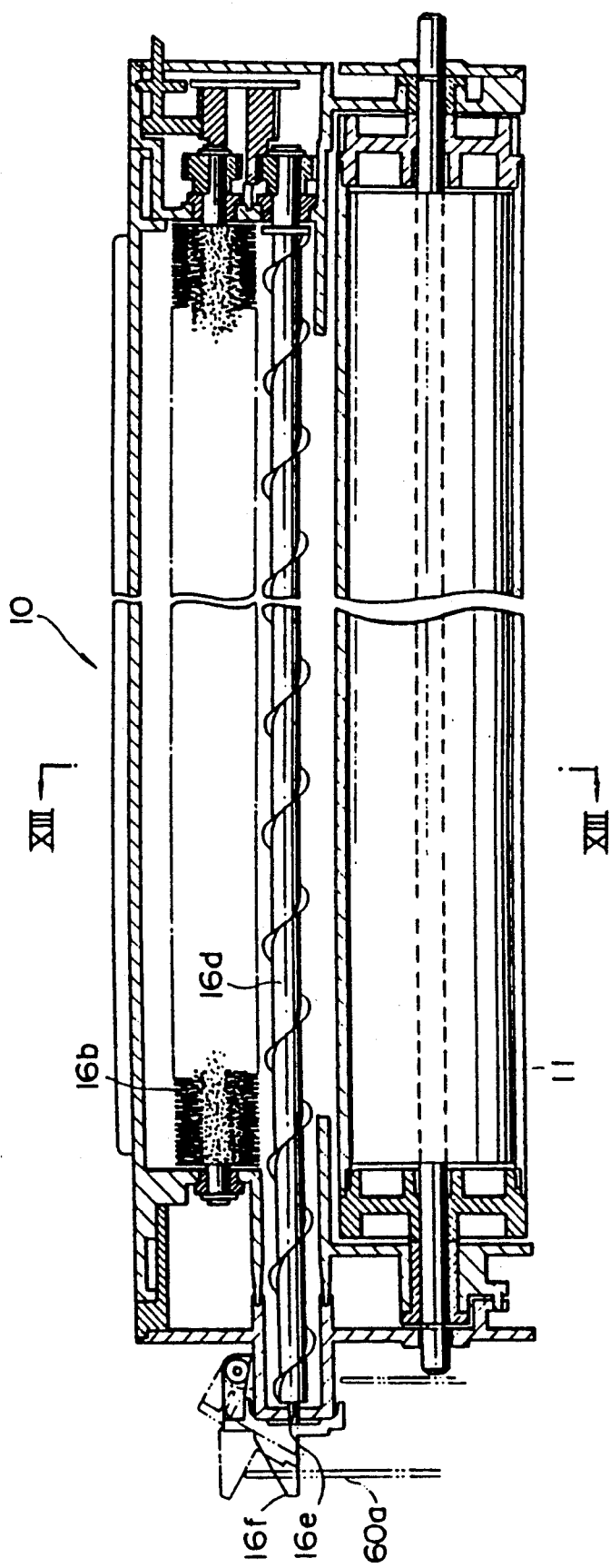
FIG. 5 is a top view of a transfer unit.

The cleaning unit 16 comprises, as shown in FIGS. 4 and 5, a cleaning brush 16a, a recovery brush 16b, a blade 16c, and an auger screw 16d. After the step of transferring an image to recording paper FP is terminated, the residual toner sticking to the photoconductive drum 11 is electrically transferred to the cleaning brush 16a and further electrically transferred from the cleaning brush 16a to the recovery brush 16b. Moreover, the toner sticking to the recovery brush 16b is scraped there from by the blade 16c, and then the toner scraped from the recovery brush 16b is conveyed by the auger screw 16d to a discharge port 16e shown in FIG. 5. Then, the toner discharged from the port 16e is accumulated in a waste toner box 60 which is detachably fitted to the side of the photoconductive drum 11 as shown in FIG. 2 by dotted lines.

A cover 16f is rotatably fitted to the discharge port 16e and the cover 16f is opened when the transfer unit 10 is installed in the printer and when it contacts a feed port 60a of a waste toner box 60, as will be described later, thus causing the toner to be discharged and stored into the waste toner box 60.

The waste toner box 60 has a feed port 60a formed at the upper end and a stepped portion 60b formed at the right end. FIG. 13A is a top view of the waster toner box, whereas FIG. 13B is a bottom view thereof.

Figure 14:
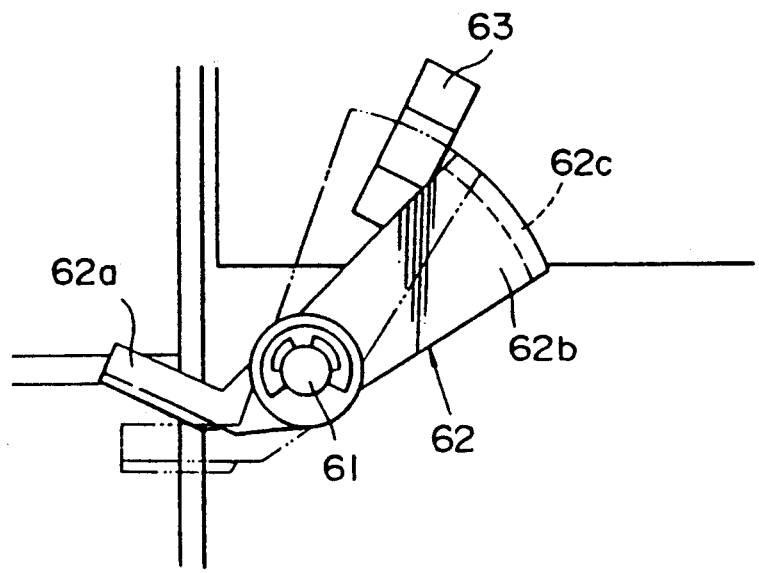
FIGS. 14 and 15 show a mechanism for detecting the state of the waste toner box.
Figure 15:
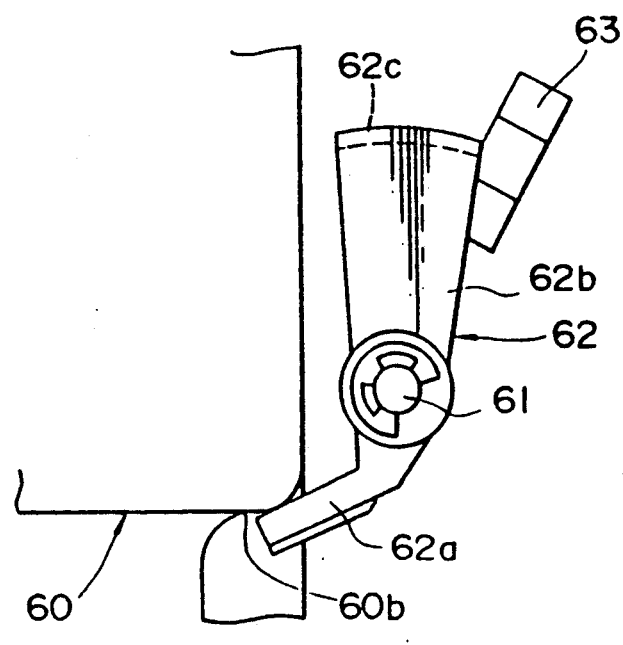

FIGS. 14 and 15 illustrate the detecting mechanism. The waste toner box 60 is movably inserted and guide along the body. The waste toner box 60 is vertically movable. An actuator 62 is rotatably pivoted via a fulcrum 61, on the body, such that a contact portion 62a is located at a position where the bottom side of the waste toner box 60 is located. A fan-shaped portion 62b is provided at the other end of the rod 62, and a light-shading (or blocking) wall 62c is formed on the arcuate peripheral edge of the fan-shaped portion. The light-shading wall 62c is capable of crossing the space between a light receiving element and a light emitting element of a photo-interrupter 63.

If the waste toner box is not attached, the rod 62 will pivot clockwise by its own weight as shown by a continuous line of FIG. 14 so that its contact portion 62a ascends and the light-shading wall 62c is located under the photo-interrupter 63. In this state, the photo-interrupter 63 produces a signal indicating that no rays of light are shaded (or blocked) and the control system decides that an error relating to the waste toner box 60 has occurred.

When the waste toner box 60 is attached, the contact portion 62a is forced down by the weight of the box and the rod is revolved counter-clockwise, up to a substantially horizontal state, as shown by a broken line of FIG. 14. The light-shading wall 62c is positioned where it screens the photo-interrupter 63. In this state, the photo-interrupter produces a signal indicating that the rays of light are shaded (or blocked) and the control system decides that no error relating to the waste toner box 60 has occurred.

When the waste toner box 60 is filled with the waste toner, the contact portion of the rod is caused to descend, due to the weight of accumulated toner, as shown in FIG. 15 and the light-shading wall 62c moves up to the left-hand side of the photo-interrupter 63. In this state, the control system decides again that an error relating to the waste toner box 60 has occurred.

In this way, one sensor can be used to detect both that the waste toner box 60 is not installed and that the waste toner box 60 is filled with the waste toner.

Although this sensor is arranged so as to monitor the presence or absence of the waster toner box and the amount of waste toner from the balance in weight between the rod 62 and the waste toner box 60, it is possible to employ a spring or the like maintain the balance as well as the dead load of the rod 62.

Figure 16:
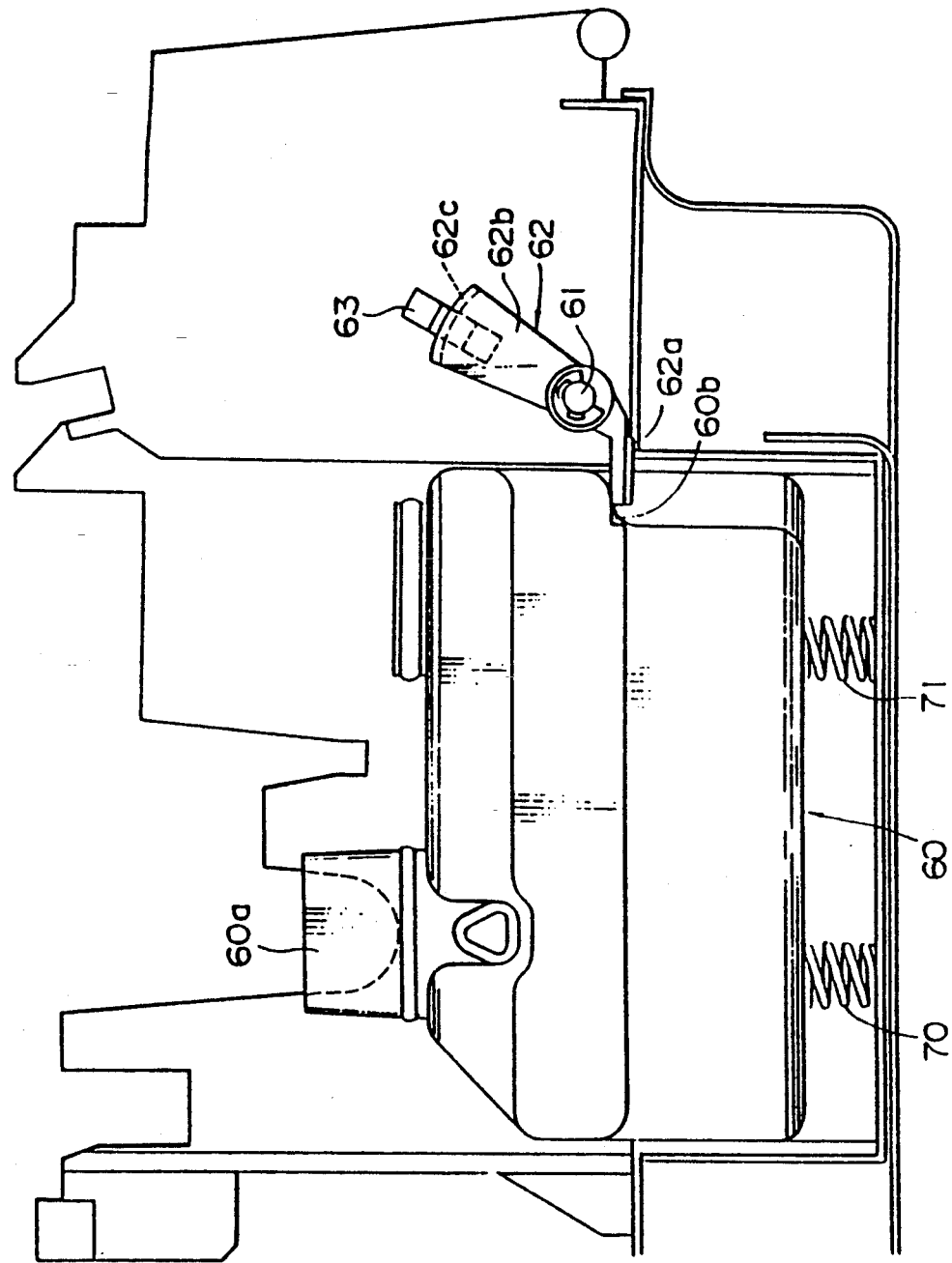
FIG. 16 shows a modification of the fitting construction of the waste toner box.

FIG. 16 shows a modification described as above. In this modification, the waste toner box 60 is vertically movably, detachably fitted to the main body of the printer on two coil springs 70, 71.

In this case, as waste toner is accumulated in the waste toner box 60, the waste toner box 60 compresses the coil springs 70, 71 and gradually moves down, whereby the actuator rod 62 rotates.

The tractor unit 20 is arranged so that, as shown in FIG. 2, the two endless belts 21, 21 stretched between a driving shaft 22 and a driven shaft 23 are driven by the main motor 40 via a field clutch (not shown, hereinafter called the F clutch) and a gear train (not shown) provided in a box 41.

The gear train extending from the main motor 40 to the drive shaft 23 in the tractor unit 20 is arranged so that the continuous recording sheet FP would be fed at the velocity of 50 mm/sec., if the tractor unit 20 independently feeds the recording sheet FP. Moreover, the gear train contains a unidirectional clutch which races with a predetermined resistance, in compliance with sheet tension when the paper is drawn at a rate higher than 50 mm/sec., to prevent the paper from overdriving the motor 40.

Figure 6:
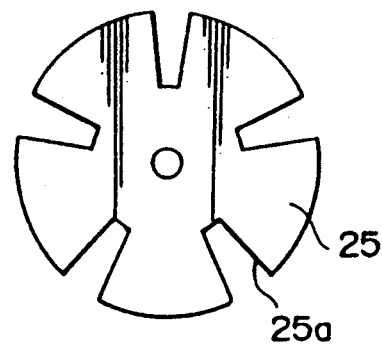
FIG. 6 shows a disc for use in generating PFS pulses.

The driven shaft 22 is connected with a disc 25 via a chain 24. The disc 25 is rotatable in response to the rotation of the driven shaft 22. As shown in FIG. 6, the disc 25 is provided with slits 25a which are spaced from each other by a predetermined space. The disc 25 is positioned between the light emitting member and the light receiving member of the photo-interrupter 26, and a pulse corresponding to the amount of movement of the recording sheet FP is thus obtainable. The photo-interrupter 26 is hereinafter called the PFS (Paper Feed Sensor), with its output constituting the PFS pulse.

The PFS pulse is outputted such that when the recording sheet is fed by ⅛ inch, one pulse is outputted. Further, the signal corresponding to the slit portion 25a and the signal corresponding to the portion other than the slit 25a correspond to the perforated lines of the continuous recording sheet FP and the non-perforated portion, respectively.

However, the positional relation between the disc 25, used for generating the PFS pulse, and a base plate, on which the photo-interrupter 26 is mounted, may not be the same in individual printers because of assembly errors. If the slits 25a formed in the disk 25 are rectangular in the radial direction the pulse width thus outputted may vary, depending on where, along the radial direction, the photo-interrupter 26 has detected the slits 26a, and depending on relative radial shifts in the position between the disc 25 and the photo-interrupter 26.

As this printer is arranged so that the paper feed error is judged by detection of the PFS pulse, the variation of the pulse width may result in misjudgment of an error.

For this reason, the slit 25a formed in the disc 25 is fan-shaped so that its width gradually increases toward the circumference. In other words, the slit 25a is defined by a pair of radii of the disc 25. With this fan shape, the width of the pulse thus outputted can be unified (i.e., the ratio between slit 25a and the non-slit portion remains constant) irrespective of the position where the photo-interrupter has detected the slit in the radial direction of the disc 25, thus preventing misjudgement of an error. In addition, the assembly precision required is eased and hence assembly workability is improved.

Sensors for detecting paper errors will subsequently described.

In a conventional laser printer using cut sheets, two sensors are provided along a sheet feed path to detect the jamming of recording sheet. Paper errors are detected when the sheet does not pass the down-stream side sensor a predetermined time after it passed the up-stream side sensor. Since there are no breaks in the continuous recording sheet, the aforementioned method of detection cannot be utilized in a printer using a continuous recording sheet.

In this printer 100, there are provided four kinds of sensors for detecting the presence or absence of the paper along the sheet feed path. The sheet empty and paper jamming conditions are detected by detecting the changing of a sheet feed speed and the lifting of the sheet.

The first sensor is an empty sensor 50 provided between the feed port 1 and the transfer unit 10. This printer 100 does not print on the portion adjacent to the perforated lines which are used as a break between pages. The perforated lines are located right under the photoconductive drum 11 of the transfer unit 10 and at the position of the fixing rollers 31, 32 when printing is stopped in this printer 100. The sheet empty condition can be detected from the output of the empty sensor 50 when the last page of the recording sheet FP is located in the printer. Moreover, by counting the PFS pulses, it is detectable what portions of the recording sheet are positioned at the transfer unit 10, at the fixing unit 30, and further at the empty sensor. Consequently, counting of the PFS pulse and the output of the empty sensor 50 can be used to detect the recording sheet FP being torn off at a non-perforated portions.

The second sensor comprises skew sensors 51, 51 provided between the fixing unit 30 and the tractor unit 20. The skew sensors 51, 51 are used for detecting the skew and cutting-off of the continuous recording sheet FP. The sensors 51, 51 are capable of detecting the sheet when at least one side thereof lifts up.

The third sensor is a top sensor 52 provided in the central part of the sheet between the skew sensors 51, 51. The top sensor 52 is used for detecting the leading end of the paper when the printing is started. After the predetermined number of pulses have been counted after the leading end of the recording sheet FP passed the top sensor 52, the leading end thereof reaches the fixing unit 30, whereas the following perforations are positioned at the transfer unit 10.

The fourth sensor is a jam sensor 53 provided in the upper cover UC substantially opposite to the top sensor 52 with the sheet feed path therebetween. The jam sensor 53 is used for detecting the sheet when the sheet is jammed in the fixing unit 30 and the central part of the recording sheet swells out to contact the jam sensor 53.

The fixing unit 30 comprises a heat roller 31 provided in the upper portion of FIG. 1, and a press roller 32. The continuous recording sheet FP is nipped between the rollers 31, 32, and is pressed against the heat roller 31 by the press roller 32 with a predetermined pressure. In the heat roller 31, a heating halogen lamp, and a thermistor for temperature detection are provided.

The heat roller 31 is driven by the main motor 40 to rotate, via the F clutch and the gear train, and arranged so that, when the continuous recording sheet FP is held between the rollers 31, 32, it is fed at the speed of 75 mm/sec.. As a result, the continuous recording sheet FP is actually driven by the fixing unit 30, whereas the tractor unit 20 mainly functions to prevent skewing of the continuous recording sheet FP.

If the continuous recording sheet FP is pressed against the heat roller 31 while printing is in a standby state, the paper may be scorched by the heat of the heat roller 31. In order to avoid the scorching of the sheet, in this printer 100, the press roller 32 facing the heat roller 31 is made vertically movable so that the continuous sheet is retracted from the heat roller 31 while printing is in a standby state.

In the meantime, the rocking of the press roller 32 and of the transfer charger 15 are implemented by the same drive means.

Figure 7:
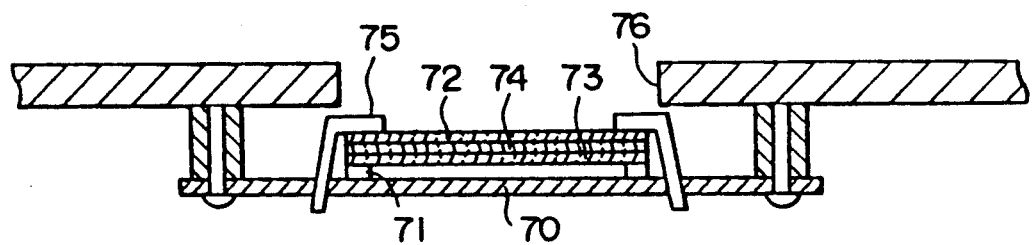
FIG. 7 illustrates a construction of a conventional liquid crystal display panel.

A general liquid crystal display panel heretofore in use is, as shown in FIG. 7, is built by mounting two glass plates 72, 73 on a substrate 70 via a conductive rubber member 71 and nipping a layer of liquid crystal 74 between the glass plates 72, 73. Moreover, the edges of the glass plates are enclosed with a frame 75, which is secured to the substrate 70. The substrate 70 is secured with screws onto the body so that the display panel can be viewed through an opening 76.

The arrangement stated above, however, has posed a problem in that the increased number of parts makes it troublesome to assemble the display unit.

Figure 8:
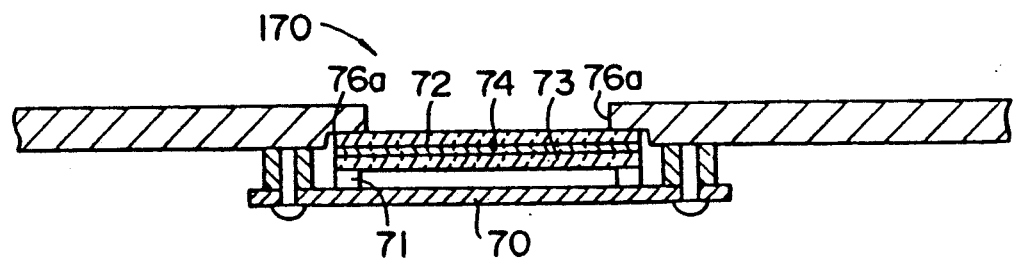
FIG. 8 shows a construction of a liquid crystal display panel of the printer of FIG. 1.

In liquid crystal display unit 170 of this embodiment, there is provided a stepped portion at the peripheral edge of the opening 76 of the body, as shown in FIG. 8. While the glass plates 72, 73, between which the liquid crystal layer 74 is inserted, are directly mated with the stepped portion 76a, the combination is secured with screws onto the body. With this arrangement, the frame can be omitted, so that the number of parts becomes reducible.

Figure 9:
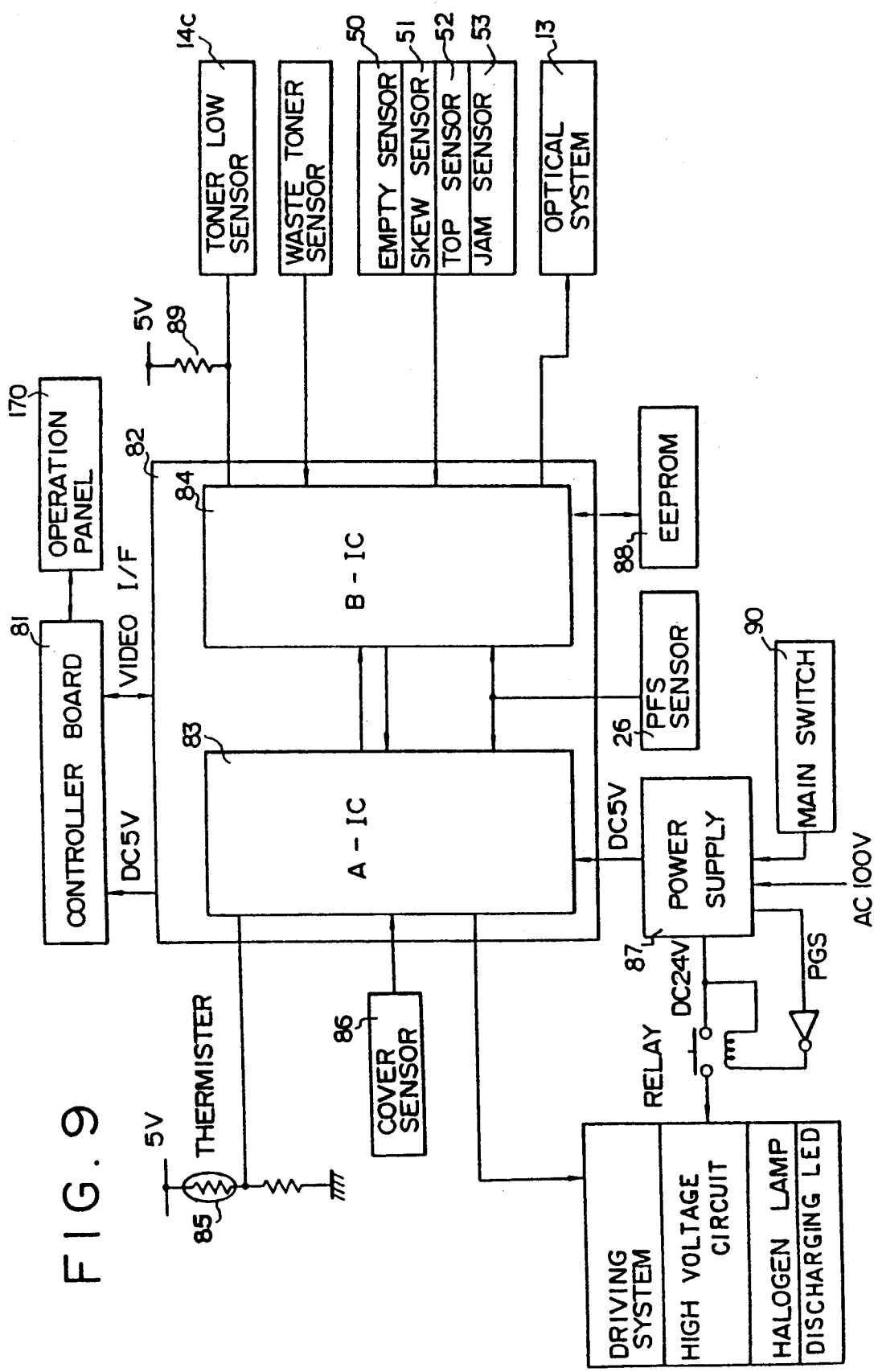
FIG. 9 is a block diagram illustrating a control system in the printer of FIG. 1.

FIG. 9 shows a control circuit of the printer.

This circuit comprises a controller 81 for developing the printing data received from a host computer into a map on a dot basis and outputting the map, and a driver 82 comprising two CPU's: one of which is an A-IC 83 mainly for controlling printing; and the other is a B-IC 84 mainly for performing error detection. The controller 81 is provided with a buffer which is capable of developing printing data corresponding to six pages of the recording sheet. New data is successively written to the buffer from time to time as the data is transferred to the driver.

The controller 81 and the driver 82 are connected via a video interface (video I/F) for transferring printing data, and a command line for transmitting various data.

The A-IC 83 is connected with a high voltage circuit, to which biases for the charger 12 and the like in the transfer unit 10 are connected. Further, a drive system including the main motor 40, the F clutch 41, the halogen lamp in the heat roller 31 are connected to the A-IC to be controlled thereby.

A thermistor 85 for detecting the temperature of the heat roller 31, a cover sensor 86 for detecting the opening and closing of the upper cover UC, and the PFS sensor (or photo-interrupter) 26 are connected to the A-IC as the sensors for supplying data to the A-IC.

The heat roller 31 is controlled so as to have a high temperature as the fixing temperature only during printing, and a low temperature as a standby temperature when the printer is in standby state, to save power and to prevent the printer temperature from rising.

Power is supplied to the halogen lamp provided in the heat roller 31 as a heat source from the power supply 87 for supplying 100 volts a.c.. The power supply is turned ON/OFF by a signal from the A-IC 83. The A-IC 83 receives an analog output from the thermistor provided adjacent to the heat roller 31 and executes A/D conversion so as to execute temperature control.

Figure 10:
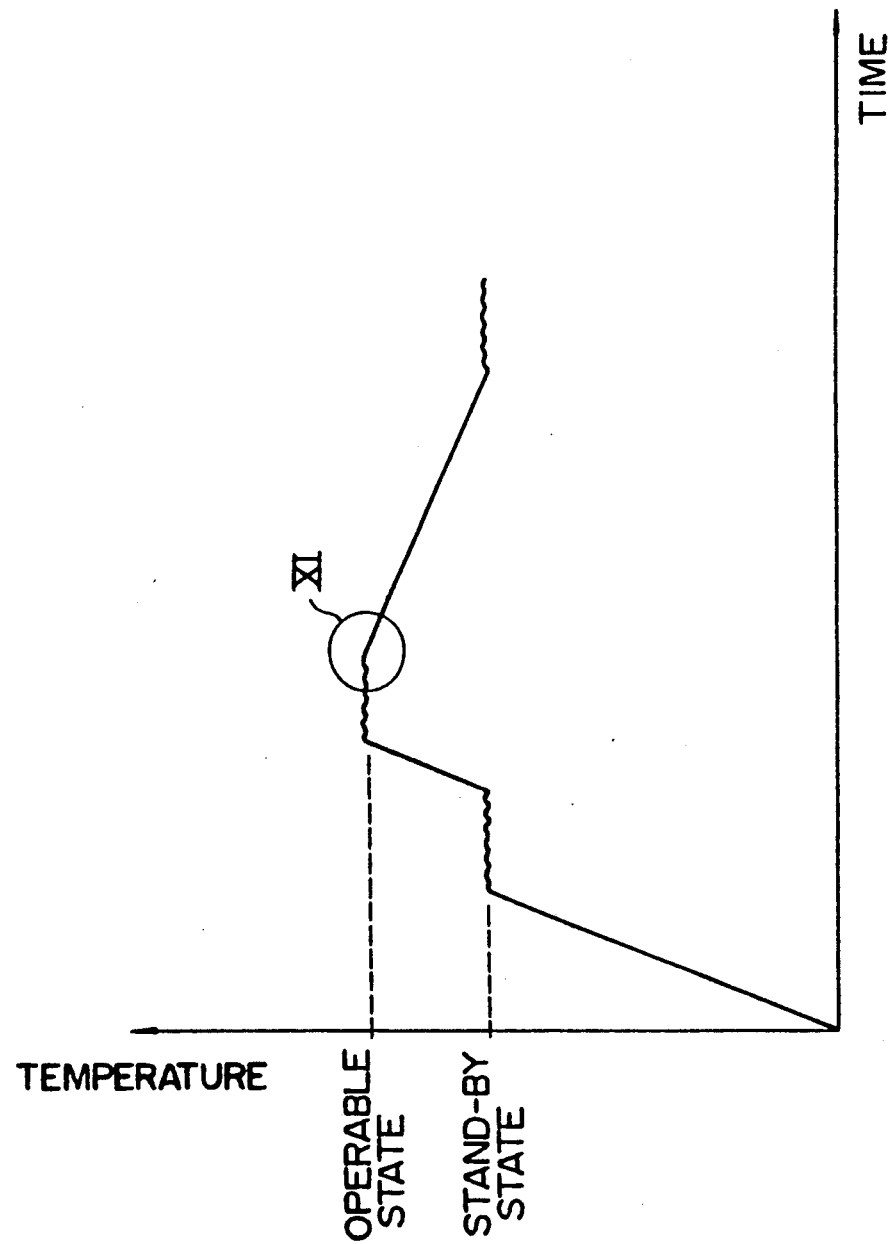
FIGS. 10 and 11 are graphs illustrating temperature control of the heat roller for the printer of FIG. 1.

The temperature control is effected with an allowance of approximately ±5 degrees. As a result, the actual temperature of the heat roller 31 fluctuates within upper and lower limits as shown in FIG. 10. Accordingly, there is a difference in time required to lower the temperature to a certain value, depending upon the actual temperature of the heat roller 31. If the actual temperature of the heat roller 31 is at the upper limit of the fixing temperature, the time required to lower the temperature to the certain temperature is relatively long, while, if the actual temperature is at the lower limit of the fixing temperature, the time is relatively short. In other words, the temperature of the heat roller 31 after a predetermined time has past, differs, depending upon the temperature of the heat roller 31 when the temperature began to be lowered. It is obvious that more warm-up time will be required to raise the temperature of the heat roller 31 to the operable (fixing) temperature, from a lower temperature than from a higher temperature.

Figure 11:
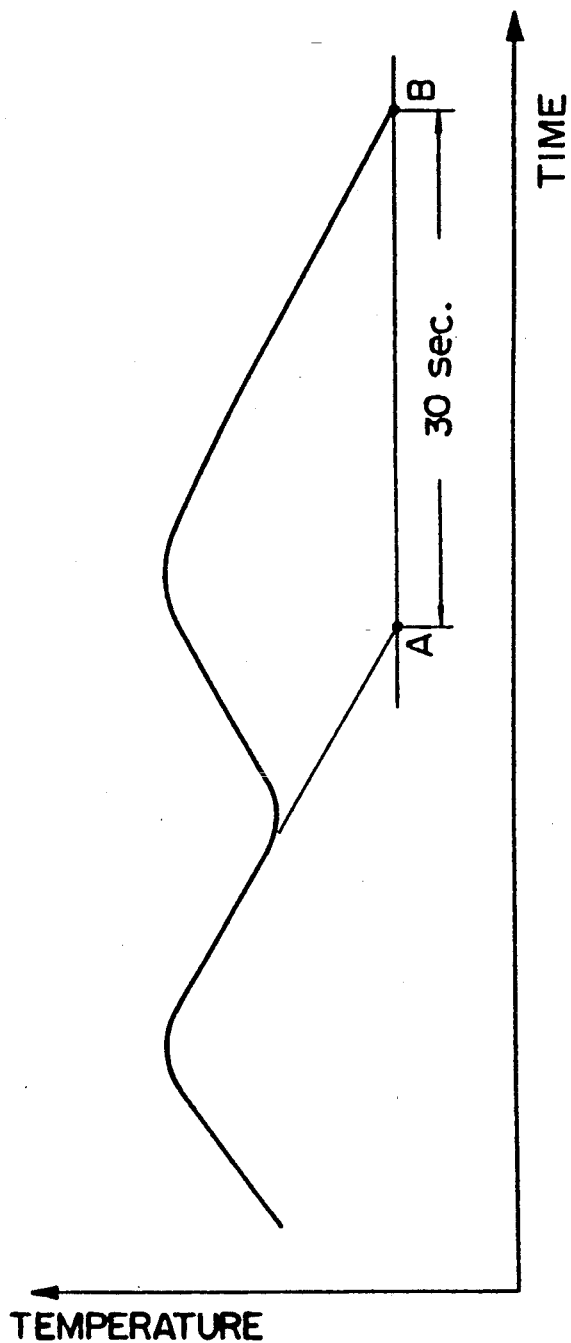

FIG. 11 shows the difference between two cases where the temperature of the heat roller 31 is lowered to a predetermined temperature a set between the fixing and the standby temperatures. Point A shows a point where the temperature falls to a predetermined temperature, having been lowered from the lower limit of the fixing temperature, and point B shows a point where the temperature falls to a predetermined temperature after having been raised to the upper limit, then lowered from the upper limit. In this example, there are approximately 30 seconds between points A and B.

In the printer of this embodiment, when the temperature is lowered from the fixing temperature to the standby temperature, the temperature is first raised to the upper limit of the fixing temperature before being lowered. In this way, the temperature is prevented from being lowered from the relatively low temperature within the fixing temperature range so that the warm-up time required to raise the temperature up to the fixing temperature again can be shortened.

The B-IC 84 is connected with a semiconductor laser of the laser scanning unit 13 and an EEPROM 88 for storing printer life data.

As means for inputting data to the B-IC 84, the empty sensor 50, the skew sensor 51, the top sensor 52 and the jam sensor 53 are connected to the B-IC 84, all of which are concerned with the paper feeding function. In addition, the B-IC 84 is connected with the waste toner sensor for warning of the presence or absence of the waste toner box 60 and the amount of accumulated waste toner, and the toner low sensor 14C for warning of the shortage of toner, which are provided in the transfer unit 10, and concerned with toner.

For the toner low sensor in a conventional laser printer, it is common practice to set the sensor to output a low level signal when no toner is detected. With this arrangement, however, the problem is that when the sensor is disconnected, the low level signal indicating the toner low condition cannot be detected. In other words, the disconnection of the sensor and the toner-sufficient condition cannot be distinguished in the conventional printer.

In this embodiment, the toner low sensor 14c outputs a high level signal when toner low is detected, while the B-IC 84 receives the signal in a pull-up state with use of a pull-up resistance 89 for receiving the signal in the pull-up state.

HIGH is thereby inputted to the B-IC 84 when toner low is detected by the sensor 14c, when disconnection occurs in the sensor system and when the developing unit 14 installed with the toner low sensor 14c not attached to the printer 100. In other words, a number of symptoms can simultaneously be detected with one sensor 14c.

The toner low sensor 14c comprises the piezoelectric element incorporated in the bottom surface of the toner case 14a and outputs a LOW level signal on sensing the pressure applied by the toner accommodated in the toner case 14a; and a HIGH level signal without such pressure.

When the toner is sufficiently stored in the toner case 14a, the toner is always placed on the piezoelectric element acting as the toner low sensor 14c, despite the operation of the scraper 19, and the LOW level signal is always outputted. On the other hand, when the amount of toner is low, the HIGH level signal is outputted irrespective of the operation of the scraper 19.

If the toner case 14a is substantially half filled with the toner, the toner is alternately placed on and swept off of the toner low sensor 14c as the scraper 19 slowly rotates, thus causing the alternative output of LOW and HIGH signals. Monitoring the duty ratio of the output of the toner low sensor 14c, the B-IC 84 judges the amount of the toner to be low when the HIGH signal exceeds 80 percent.

As toner is not supplied to the developing roller 14b by the scraper 19 immediately after power is supplied, the output of the toner low sensor during the first three seconds, or, for two rotations of the scraper is ignored.

After the elapse of three seconds, the toner low sensor 14c starts monitoring. Misjudgment of the toner low condition can thereby be prevented before the operation of the scraper 19 when power is supplied.

A-IC 83 and B-IC 84 control the printer 100 by exchanging data via a plurality of signal lines. From the B-IC 84 to the A-IC 83, signals such as a signal indicating that the B-IC 84 is in a standby state, a STOP signal for immediately stopping the operation of each unit of the printer 100 when an emergency error occurs, even if the printing is being executed, and a PAUSE signal for stopping the operation of each unit after predetermined operations, when a less urgent error occurs are transmitted.

On the other hand, error signals indicating errors in the drive system is transmitted from the A-IC 83 to the B-IC 84.

The B-IC 84 analyzes the errors detected by itself and the errors transmitted from the A-IC 83 thereto, then determines their degrees of urgency in accordance with predetermined standards. The B-IC 84 selects the STOP or PAUSE signal depending on the degree of emergency, and then transmits the signal to the A-IC 83. The less urgent errors are errors relating to toner overflow, toner low and paper empty, while the other errors are treated as emergency errors.

Figure 12:
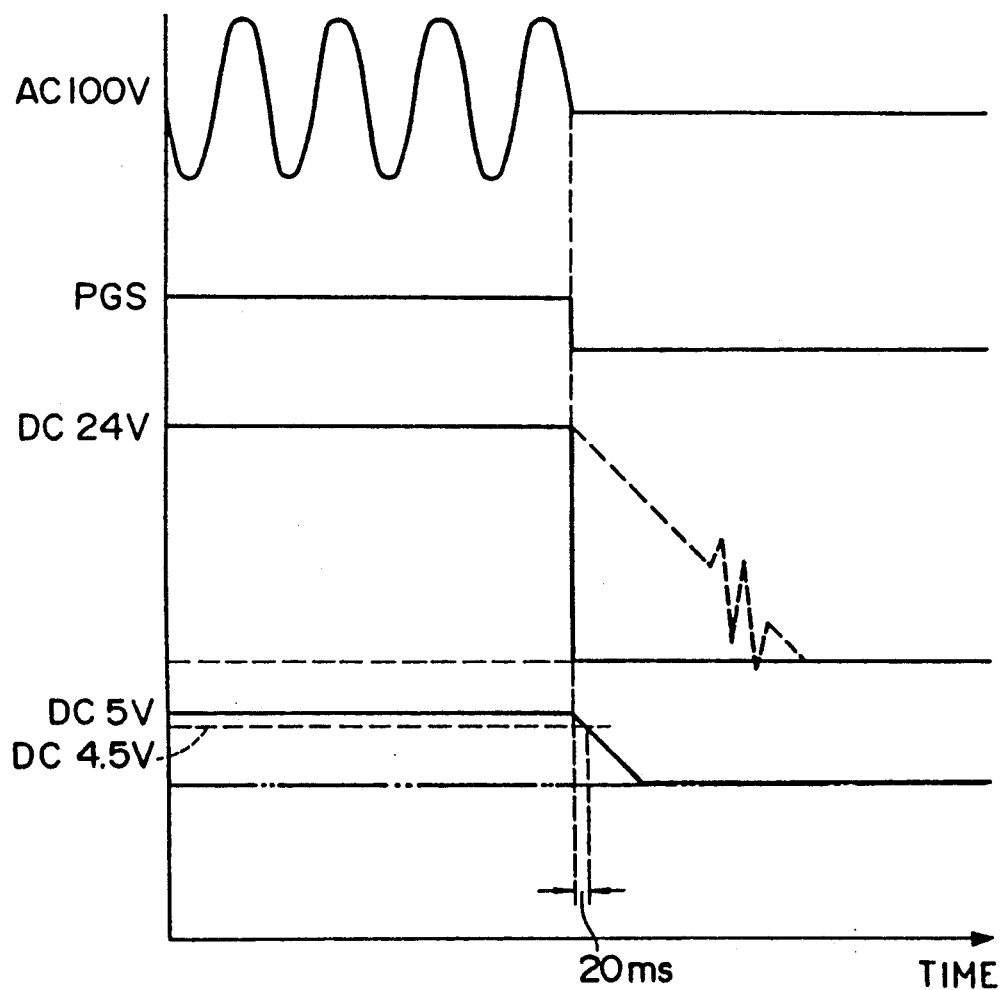
FIG. 12 is a graph illustrating power supply control of the printer of FIG. 1.

One hundred volts a.c. is applied to the printer, with the control system being driven at 5 volts d.c. and the driving system, such as the motor being driven at 24 volts d.c. When a main switch 90 of the printer 100 is turned off, the voltage gradually drops from 24 volts d.c. to 0 volt, as shown by a broken line in FIG. 12.

The 5 volts d.c. power supply for the control system is designed so that more than 90 percent of the rated voltage (i.e. 4.5 volts d.c.) is held at least 20 msec. for storing data after the main power supply is turned off. Because, if the voltage becomes less than 90 percent of the rated voltage, the control system may fail to control driving system.

As to 24 volts d.c. power supply for the driving system, the voltage tends to fluctuate while it drops, because of the operation of a protection circuit on the power supply side. Besides the control system does not operate as 5 d.c. is cut off at that point in time, which may cause vibration of the motor and hence malfunctions.

In this printer 100, the voltage applied to the driving system is instantaneously dropped from 24 volts d.c. to 0 volt on turning off the 100 volts a.c. main power supply 87 in order to prevent the aforementioned malfunctions. A relay is provided between the power supply and the driving system to act as a switch for the function stated above. The relay operates to cut off 24 volts d.c., either when a power good signal (PGS) representing the presence of the main power 87 supply is cut off, or when the upper cover is opened.

By instantaneously dropping the voltage from 24 volts d.c. to 0 volts as above, the driving system is stopped while the control system functions with 5 volts d.c. being applied. Moreover, the fluctuation of the voltage is prevented while it is dropping. Consequently, the motor is prevented from vibrating and hence malfunctioning.

Laser printers are generally provided with a data recovery function for reprinting a blank page due to jamming or the like.

The printer 100 of this embodiment is designed to determine the number of pages to be reprinted (page data) in the driver according to the respective errors: the paper jamming error, the paper empty error detected in a portion other than the perforations or when the upper cover UC is opened during printing. Based on the number of pages, the controller 81 requests the host computer to transmit printing data to be reprinted.

The driver detects the page being printed at present according to the PFS pulse.

There are four kinds of page recovery data to be transmitted; namely, data "0" requiring no recovery, "1" requiring only the one whole page which is being transferred to be reprinted, "2" requiring the page being transferred and the page previously transferred to be reprinted, and "3" requiring the page being transferred and preceding two pages to be reprinted.

When trouble occurs on the first page, the page data "1" is transmitted, the controller 81 requests the host computer for data on the page being printed and transmits the data to the driver again after developing it in the buffer.

When trouble occurs on the second page, the third page or thereafter, the respective data is set at "2" or "3" and the controller 81 requests the host computer for data on the pages to be reprinted.

When the opening of the upper cover UC is detected during printing of the third page, the page data is set at "1".

It may otherwise be arranged that the page data on reprinting is not determined by the page that has undergone trouble as stated above, but by the number of pages to be traced back, depending on the place where jamming has occurred.

Although reference has been made to the use of continuous sheet whose page length is 11 inches long in the embodiment shown, the continuous sheet whose page length is 12 inches long may also be used by changing the counter for counting the PFS pulses.

If 12-inch page length sheet is used in this printer 100, some additional arrangements may also be considered such that the last page carrying an unfixed toner image is discharged when the printing is terminated, that the page remaining in the printer 100 is fed when printing is restarted, or that a perforated line is located at the fixing unit with the portion one inch from the next perforation being located at the transfer unit 14.

As set forth above, the detection device for a storage vessel according to the present invention provides the same information in cases both where the storage vessel has not been installed and where the weight of the contents of the vessel has exceeded a predetermined value. As a result, those cases stated above can be distinguished from a case where the weight of the contents of the vessel has not exceeded the predetermined value.

When the men-installation of the vessel and the overweight of waste toner therein are detected as errors, these two errors can be detected by means of one detection means.

The present disclosure relates to subject matters contained in Japanese patent applications No. HEI 1-293712 (filed on Nov. 10, 1989) and No. HEI 2-93659 (filed on Apr. 9, 1990) which are expressly incorporated herein by reference in their entireties.

What is claimed is:

1. A storage vessel detecting mechanism installed in a main apparatus, comprising:
    a storage vessel detachably installed in said main apparatus;
    guide means for vertically guiding said storage vessel;
    a movable member pivoted to said main apparatus, one end of said movable member adapted to be engaged with said storage vessel, the other end of said movable member being formed to be relatively heavy so that when said one end of said movable member is disengaged from said vessel, said one end is raised by the weight of said other end of said movable member to locate said other end at a first position, said one end of said movable member being pressed down to locate said other end at a second position when said storage vessel, containing a predetermined amount of substance therein is installed and engaged with said movable member;
    discrimination means for discriminating whether said other end of said movavle member is located in a predetermined range between said first and second positions; and
    determination means for determining an error condition of said vessel when said other end is located in a position other than in said predetermined range.

2. The storage vessel detecting mechanism according to claim 1, wherein said discrimination means comprises:
    light emitting means; for emitting light
    light receiving means for receiving light emitted from said light emitting means; and
    light shielding means provided on said other end of said movable member, wherein said light shielding means, shields the light emitted by said light emitting means when said other end of said movable member is located in said predetermined range.

3. The storage vessel detecting mechanism according to claim 1, which further comprises support means for supporting said vessel by vertically applying a resilient force to said vessel.

4. The storage vessel detecting mechanism according to claim 3, wherein said support means comprising at least one spring.

5. The storage vessel detecting mechanism according to claim 4, wherein said at-least one spring is provided between the bottom of said vessel and said main apparatus.

6. An electrophotographic printer in which toner is used for forming an image, which comprises:
    a storage vessel detachably fitted in said printer for storing waste toner;
    guide means provided in said printer for vertically guiding said storage vessel;
    a movable member pivoted to said printer, one end of said movable member adapted to be engaged with said storage vessel, the other end of said movable member being formed to be relatively heavy so that when said one end of said movable member is disengaged from sadi vessel, said one end is lifted by the dead weight of said other end of said movable member to locate said other end at a first position, said one end of said movable member being pressed down to locate said other end at a second position when said storage vessel containing a predetermined amount of toner therein is installed and engaged with said movable member;
    discrimination means for discriminating whether said other end of said movable member is located in a predetermined range between said first and second positions; and
    determination means for determining an error condition of said vessel when said other end is located in a position other than in said predetermined range. positions; and determination means for determining an error condition of said vessel when said other end is located in a position other than in said predetermined range.

7. The printer according to claim 6, wherein said discrimination means comprises:

light emitting means; for emitting light light receiving means for receiving light emitted from said light emitting means; and light shielding means provided on said other end of said movable member, wherein said light shielding means shields the light emitted by said light emitting means when said other end of said movable member is located in said predetermined range.

8. The printer according to claim 7, which further comprises support means supporting said vessel by vertically applying a resilient force to said vessel.

9. The printer according to claim 8, wherein said support means comprises at least one spring.

10. The printer according to claim 9, wherein said at-least-one spring is provided between the bottom of said vessel and said main apparatus.

11. A storage vessel detecting mechanism installed in an apparatus, said detecting mechanism comprising:

a storage vessel detachably installed in said apparatus;

guide means for guiding the movement of said storage vessel to an installed position;

a movable member pivotably mounted to said apparatus, one end of said movable member adapted to be engaged by said storage vessel, the other end of said movable member being formed so that when said one end of said movable member is disengaged from said storage vessel, said other end is lowered to be located at a first position, said one end of said movable member being pressed down to locate said other end at a second position when said storage vessel, containing a predetermined amount of a substance therein, is installed and engaged with said movable member;

discrimination means for discriminating whether said other end of said movable member is located in a predetermined range between said first and said second positions; and determination means for determining an error condition of said storage vessel when said other end is located in position other than is said predetermined range.

* * * * *

UNITED STATES PATENT AND TRADEMARK OFFICE
CERTIFICATE OF CORRECTION

PATENT NO. : 5,101,228
DATED : March 31, 1992
INVENTOR(S) : T. NISHIKAWA et al.

It is certified that error appears in the above-indentified patent and that said Letters Patent is hereby corrected as shown below:

On the title page, item: [56], "References Cited", "FOREIGN PATENT DOCUMENTS", line 1, change "1-983" to ---64-983---.

At column 14, line 15 (claim 1, line 20), change "movavle" to ---movable---.

At column 14, line 38 (claim 4, line 2), change "comprising" to ---comprises---.

At column 14, line 55 (claim 6, line 12), change "sadi" to ---said---.

At column 15, line 8 (claim 7, line 3), change "means; for emitting light" to ---means for emitting light;---.

Signed and Sealed this

Eighth Day of October, 1996

Attest:

BRUCE LEHMAN

*Attesting Officer*  *Commissioner of Patents and Trademarks*